(12) United States Patent
Destarac et al.

(10) Patent No.: US 7,439,292 B2
(45) Date of Patent: *Oct. 21, 2008

(54) USE OF BLOCK COPOLYMERS BEARING PHOSPHATE AND/OR PHOSPHONATE FUNCTIONS AS ADHESION PROMOTERS OR AS PROTECTING AGENTS AGAINST THE CORROSION OF A METALLIC SURFACE

(75) Inventors: Mathias Destarac, Paris (FR); Cécile Bonnet-Gonnet, Lyons (FR); Arnaud Cadix, Paris (FR)

(73) Assignee: Rhodia Chimie, Paris (FR)

( * ) Notice: Subject to any disclaimer, the term of this patent is extended or adjusted under 35 U.S.C. 154(b) by 266 days.

This patent is subject to a terminal disclaimer.

(21) Appl. No.: 10/507,329

(22) PCT Filed: Mar. 13, 2003

(86) PCT No.: PCT/FR03/00803

§ 371 (c)(1),
(2), (4) Date: Jan. 31, 2005

(87) PCT Pub. No.: WO03/076531

PCT Pub. Date: Sep. 18, 2003

(65) Prior Publication Data

US 2005/0119386 A1    Jun. 2, 2005

(30) Foreign Application Priority Data

Mar. 13, 2002   (FR) ................... 02 03110

(51) Int. Cl.
*C08L 1/00*    (2006.01)
(52) U.S. Cl. ...................... 524/379; 524/556
(58) Field of Classification Search .............. 524/379, 524/556

See application file for complete search history.

(56) References Cited

U.S. PATENT DOCUMENTS 6,559,233 B2 *   5/2003   Bavouzet et al. ............ 525/244

* cited by examiner

*Primary Examiner*—Robert D. Harlan
(74) *Attorney, Agent, or Firm*—Hunton & Williams LLP

(57) ABSTRACT

The invention relates to the use of a block copolymer having at least one block that comprises phosphate and/or phosphonate functions, as an additive for film-forming compositions, such as paint, latex or mastic which is optionally siliconised in order to ensure or promote the adhesion of the aforementioned compositions on a metallic surface or to protect said metallic surface against corrosion. The invention also relates to film-forming compositions comprising the abovementioned block copolymers.

28 Claims, 3 Drawing Sheets

Figure 1: Plate painted with the additive-free reference paint
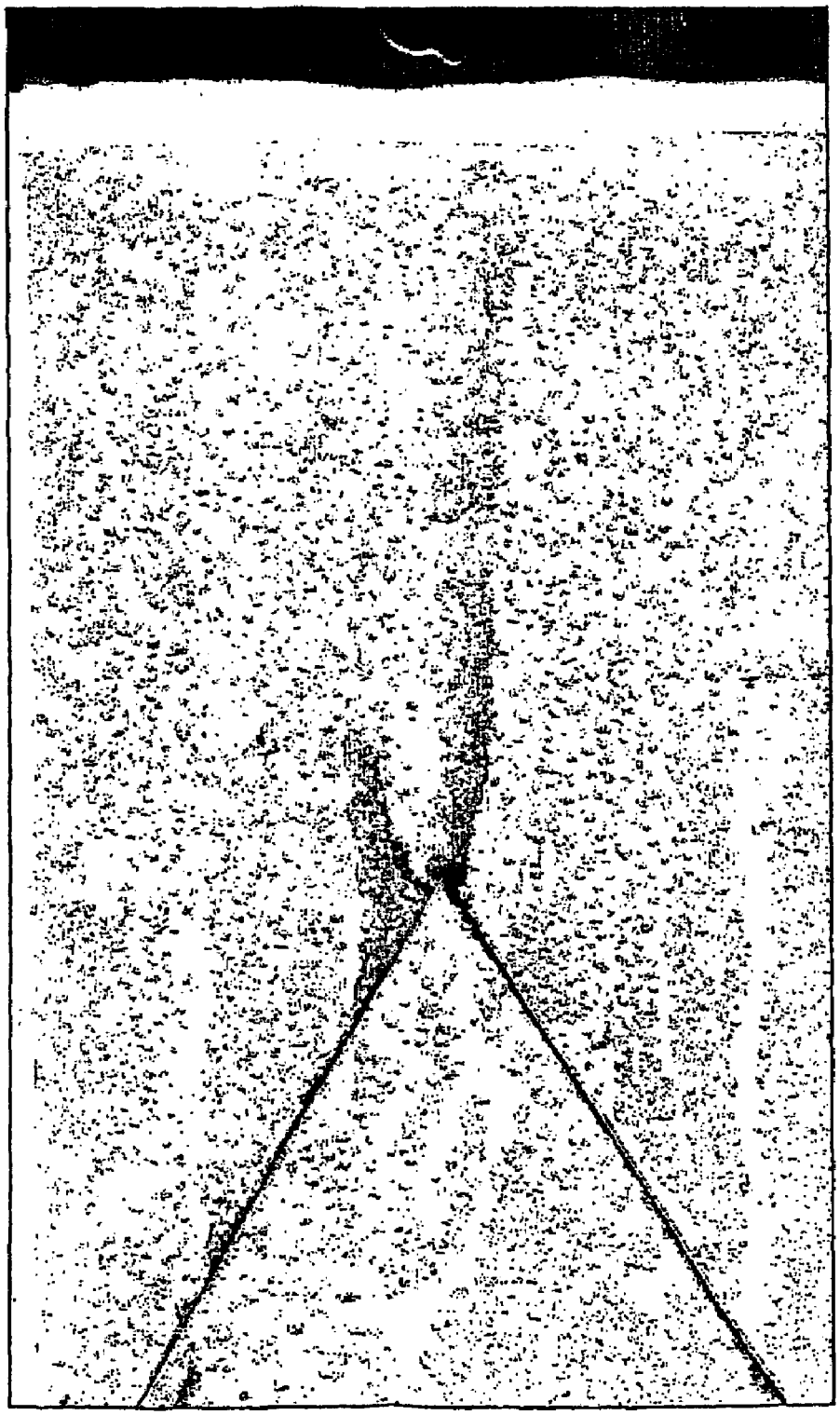

Figure 2: Plate painted with the paint comprising the additive of example 4

Figure 3: Plate painted with the paint comprising the additive of example 5

USE OF BLOCK COPOLYMERS BEARING PHOSPHATE AND/OR PHOSPHONATE FUNCTIONS AS ADHESION PROMOTERS OR AS PROTECTING AGENTS AGAINST THE CORROSION OF A METALLIC SURFACE

This application is an application under 35 U.S.C. Section 371 of International Application Number PCT/FR03/00803 filed on Mar. 13, 2003.

The present invention relates to the use of a block copolymer, at least one block of which comprises phosphate and/or phosphonate functional groups, as additive for film-forming compositions, in particular of optionally silicone-comprising mastic, latex or paint type, for providing or promoting the adhesion of these compositions to a metal surface or for protecting said metal surface from corrosion.

The invention also relates to the film-forming compositions comprising these block copolymers.

The term "metal surface", within the meaning of the invention, is to be understood as the surfaces of materials based on metals or on semimetals.

The term "metals" is understood to mean, in the present invention, any substance which is distinguished from nonmetallic substances by a high conductivity for electricity and heat, this conductivity decreasing with a rise in temperature, and by their high reflectivity with respect to light, which gives them a characteristic metallic sheen.

Mention may be made, as examples of metals or semimetals, of the elements of the Periodic Table of the Elements listed in the table on page 227 of the document entitled "Encyclopaedia Britannica", Volume 15, 1966, incorporated by reference.

Mention may in particular be made of the elements of the Periodic Table of the Elements chosen from the group of the alkali metals or alkaline earth metals, the transition metals, aluminum, gallium, indium, thallium, silicon, germanium, tin, lead, arsenic, antimony, bismuth, tellurium, polonium or astatine, and their oxides or their alloys.

Mention may be made, as preferred list of metal materials, of aluminum, duralumin, zinc, tin, copper, copper alloys, such as bronze or brass, iron, steel, optionally stainless or galvanized, silver or vermeil.

When a film-forming composition of paint or mastic type, optionally comprising silicone, is applied directly to the surface of one of these metal materials, poor anchoring of the film-forming composition to the metal surface is generally observed, which results in a coating of mediocre quality being obtained.

Furthermore, it is also possible to observe, in the case of materials comprising iron, such as steel, flash corrosion brought about by the direct application to the metal surface of a film-forming composition of paint or mastic type, optionally comprising silicone, in particular when it is an aqueous composition, which has a considerable detrimental effect on the quality and the durability of these coatings.

Moreover, an additional problem arises in the case of materials made of aluminum, which is the very low wettability of the aluminum surface, which makes it impossible to directly apply a film-forming composition of paint or mastic type, optionally comprising silicone, to the surface of a material made of aluminum or else results, in the best of cases, in a coating of mediocre quality being obtained.

Furthermore, the properties of adhesion of the coatings thus obtained deteriorate in the presence of moisture or on contact of these surfaces with water, in particular because of phenomena of diffusion of the water at the interface.

The need existed to improve the properties of adhesion to metal surfaces.

In point of fact, the Applicant Company has discovered that some block copolymers, at least one block of which comprises phosphate and/or phosphonate functional groups, can be used as additives in a film-forming composition to provide or promote the adhesion of these compositions to metal surfaces.

The modifications to adhesive properties of the film-forming compositions induced by the presence of these block copolymers make it possible to alleviate the problems encountered to date and it is possible to obtain an improvement in the effectiveness of the application of a film-forming composition of paint or mastic type but also an improvement in the adhesion to the support of this film-forming composition which is effective and lasting, even in the presence of water.

This improvement in the adhesion of the coating is reflected by a prolonged decorative, protective or functional effect, advantageously throughout the lifetime of the product, without the effect induced by the coating produced being capable of being threatened by washing with an aqueous solution (S) with a pH of between 1 and 12, optionally comprising sodium chloride, in a proportion of a maximum concentration of 10 M, peeling or disintegration of said coating, in particular under the effect of mechanical stresses.

More generally, the presence of these block copolymers of the invention in the film-forming compositions gives these compositions an affinity with respect to the metal surface such that this deposited layer remains firmly attached to the treated surface for relative humidities ranging from 0 to 100%. Advantageously, the deposited layer remains firmly attached in the presence of water, indeed even under immersion in water.

Due to the modification in the surface properties which they bring about, and taking into account their behavior toward water, the coatings based on the film-forming compositions comprising the block copolymers produced according to the invention can be employed in numerous fields of application.

Thus, according to a first aspect, a subject matter of the present invention is the use of a block copolymer, at least one block of which comprises phosphate and/or phosphonate functional groups, said copolymer optionally being dissolved in a solvent, such as an organic solvent, water or a water/alcohol mixture, as additive in a film-forming composition, to provide or promote the adhesion of said composition to a metal surface.

According to a second aspect, a subject matter of the present invention is the use of a block copolymer, at least one block of which comprises phosphate functional groups and/or phosphonate functional groups, said copolymer optionally being dissolved in a solvent, such as an organic solvent, water or a water/alcohol mixture, as additive in a film-forming composition, to protect said metal surface from corrosion.

Another subject matter of the present invention is a film-forming composition comprising said block copolymer.

This film-forming composition according to the invention can be applied to the metal surface by applying this composition to the metal surface or by immersing the surface to be treated in the composition, and by then subsequently removing, at least partially and preferably largely, the solvent initially present in this composition, for example by drying.

The term "partial removal" is to be understood as meaning the removal of at least 70% by mass of the solvent initially present, preferably of at least 80% by mass and more advantageously still of at least 90% by mass.

The removal "largely" of the solvent corresponds, for its part, to the removal of at least 95% by mass of the solvent initially present, preferably of at least 97% by mass and more advantageously still of at least 99% by mass.

The concentration of block copolymers in the film-forming composition is, in the most general case, between 0.001 and 20% by mass with respect to the total mass of the solids content of said composition.

In order to obtain optimum wetting of the support and to avoid the appearance of heterogeneities within the deposited layer produced, it is preferable to use a block copolymer concentration of between 0.005 and 10% and more preferably still of between 0.01 and 5% by mass with respect to the total mass of the solids content of said composition.

Such contents confer, on the aqueous composition, a viscosity suitable for application to the metal surface. Furthermore, these contents result in the production of a continuous film (without the appearance of dewetting regions) when they are applied using a film drawer to flat surfaces or, more generally, when the surface to be treated is immersed in said solution.

In addition, these concentrations are particularly well suited to carrying out, by simple drying, partial or complete removal of an aqueous solvent.

The drying is carried out, for example, at a temperature of between 15° C. and 50° C. (preferably between 19 and 25° C.) and under humidity conditions of between 10% and 70% and preferably between 50% and 60%.

In the case where the deposited layer of the film-forming composition on the metal surface is produced using a film drawer, the film obtained has a thickness of between 50 microns and 1 mm and advantageously between 70 and 500 microns. Thus, the thickness of the film deposited can more advantageously still be of the order of 100 microns.

After the drying, a deposited layer of the film-forming composition is obtained with a thickness of between 25 microns and 0.5 mm, advantageously between 30 and 100 microns and preferably of the order of 50 microns.

The term "film-forming composition", within the meaning of the invention, is to be understood as any composition in the form of a dispersion or of a solution, generally in the form of a dispersion where the dispersed phase advantageously exhibits a size of between 10 Å and 100 μm, comprising:

as continuous or solvent phase, an organic solvent or water, optionally in combination with other water-soluble compounds, such as alcohols and in particular ethanol; and compounds of polymer or polymer precursor, acrylic resin or silicone type which are capable of resulting in the formation of a polymer film, of an acrylic film or of a silicone film following the application of the composition to a surface and following the at least partial evaporation of the solvent, that is to say of the organic solvent or of the water, and optionally of the other water-soluble compounds, such as ethanol.

Thus, without implied limitation, the film-forming compositions of the invention can, for example, be compositions comprising an aqueous or aqueous/alcoholic dispersion of carbonaceous polymers in the form of a latex or of a formulation, of adhesive, mastic or paint type, for example, comprising such a latex, or of silicone precursors and in particular a mastic composition of the type of those disclosed in the documents EP 665 862, WO 98/13410 or WO 99/65973.

The film-forming compositions of the invention can also be compositions comprising a dispersion of carbonaceous polymers in the form of a latex or of a formulation, of adhesive, mastic or paint type, in an organic solvent.

During the application of the block copolymers of the invention to a metal surface, the anchoring block or blocks functionalized by the phosphate and/or phosphonate functional groups create chemical bonds with the atoms of the metal surface. These chemical reactions take place on the sites capable of being corroded and, for this reason, bring about protection of the metal surface.

The separate blocks of the anchoring block of the block copolymer make it possible to adjust the condition of the metal surface to the desired application, in particular to increase interactions between the composition (F) and the surface and thus the adhesion energy.

These blocks can additionally comprise one or more chemical functional groups capable of creating lasting chemical bonds with the polymer present in the film-forming composition (F).

Mention may be made, by way of examples of chemical functional groups, of the hydroxyl, epoxy, carboxyl, amino or isocyanate functional groups, which are capable of acting in a crosslinking stage.

The block copolymers of the present invention exhibit at least one block comprising phosphate and/or phosphonate functional groups.

This block, known as anchoring block, can be a homopolymer based on a monomer comprising phosphate or phosphonate functional groups.

The anchoring block can also be a random polymer based on a monomer comprising one or other of these phosphate or phosphonate functional groups or their mixtures in an amount of between 0.1 and 100% by weight of said monomers with respect to the total weight of the anchoring block. Preferably, this amount of said monomers is between 0.5% and 50% by weight of said monomers with respect to the total weight of the anchoring block. More preferably still, this amount is between 2% and 20% by weight of said monomers with respect to the total weight of the anchoring block.

The monomer comprising phosphonates can be chosen, for example, from:

N-methacrylamidomethylphosphonic acid ester derivatives, in particular the n-propyl ester (RN 31857-11-1), the methyl ester (RN 31857-12-2), the ethyl ester (RN 31857-13-3), the n-butyl ester (RN 31857-14-4) or the isopropyl ester (RN 51239-00-0), and their phosphonic monoacid and diacid derivatives, such as N-methacrylamidomethylphosphonic diacid (RN 109421-20-7), N-methacrylamidoethylphosphonic acid ester derivatives, such as N-methacrylamidoethylphosphonic acid dimethyl ester (RN 266356-40-5) or N-methacrylamidoethylphosphonic acid di(2-butyl-3,3-dimethyl) ester (RN 266356-45-0), and their phosphonic monoacid and diacid derivatives, such as N-methacrylamidoethylphosphonic diacid (RN 80730-17-2), N-acrylamidomethylphosphonic acid ester derivatives, such as N-acrylamidomethylphosphonic acid dimethyl ester (RN 24610-95-5), N-acrylamidomethylphosphonic acid diethyl ester (RN 24610-96-6) or bis(2-chloropropyl) N-acrylamidomethylphosphonate (RN 50283-36-8), and their phosphonic monoacid and diacid derivatives, such as N-acrylamidomethylphosphonic acid (RN 151752-38-4), the vinylbenzylphosphonate dialkyl ester derivatives, in particular the di(n-propyl) (RN 60181-26-2), di(isopropyl) (RN 159358-34-6), diethyl (RN 726-61-4), dimethyl (RN 266356-24-5), di(2-butyl-3,3-dimethyl) (RN 266356-29-0) and di(t-butyl) (RN 159358-33-5) ester derivatives, and their phosphonic monoacid and diacid alternative forms, such as vinylbenzylphosphonic diacid (RN 53459-43-1), diethyl 2-(4-vinylphenyl)ethanephosphonate (RN 61737-88-0), dialkylphosphonoalkyl acrylate and methacrylate derivatives, such as 2-(acryloyloxy)ethylphosphonic acid dimethyl ester (RN 54731-78-1) and 2-(methacryloyloxy) ethylphosphonic acid dimethyl ester (RN 22432-83-3), 2-(methacryloyloxy)methylphosphonic acid diethyl ester (RN 60161-88-8), 2-(methacryloyloxy)methylphosphonic acid dimethyl ester (RN 63411-25-6), 2-(methacryloyloxy)propylphosphonic acid dimethyl ester (RN 252210-28-9), 2-(acryloyloxy)methylphosphonic acid diisopropyl ester (RN 51238-98-3) or 2-(acryloyloxy)ethylphosphonic acid diethyl ester (RN 20903-86-0), and their phosphonic monoacid and diacid alternative forms, such as 2-(methacryloyloxy)ethylphosphonic acid (RN 80730-17-2), 2-(methacryloyloxy)methylphosphonic acid (RN 87243-97-8), 2-(methacryloyloxy)propylphosphonic acid (RN 252210-30-3), 2-(acryloyloxy)propylphosphonic acid (RN 254103-47-4) and 2-(acryloyloxy)ethylphosphonic acid, vinylphosphonic acid, optionally substituted by cyano, phenyl, ester or acetate groups, vinylidene-phosphonic acid, in the sodium salt form or the form of its isopropyl ester, or bis(2-chloroethyl)vinyl-phosphonate.

The monomers comprising a phosphonic mono- or diacid functional group can be used in the partially or completely neutralized form, optionally neutralized by an amine, for example dicyclohexylamine.

The monomer can also be chosen from the phosphate analogs of the phosphonate-comprising monomers described above. These monomers then comprise a —C—O—P— sequence in comparison with the —C—P— sequence of the phosphonates.

Mention may be made, as specific phosphate-comprising monomers, of:

2-(methacryloyloxy)ethyl phosphate,
2-(acryloyloxy)ethyl phosphate,
2-(methacryloyloxy)propyl phosphate,
2-(acryloyloxy)propyl phosphate, and
acrylates or methacrylates of polyethylene glycol omega phosphates or acrylates or methacrylates of polypropylene glycol omega phosphates.

Preference is given, among the phosphonate-comprising or phosphate-comprising monomers which come within the scope of the present invention, to the use of the following monomers:

vinylphosphonic acid,
2-(methacryloyloxy)ethylphosphonic acid,
2-(acryloyloxy)ethylphosphonic acid,
2-(methacryloyloxy)ethyl phosphate, and
2-(acryloyloxy)ethyl phosphate.

The proportion by mass of the anchoring block with respect to the total weight of the block copolymer of the present invention varies between 90:10 and 10:90.

The other monomers of the anchoring block which are involved in the context of the present invention can be monomers having a hydrophilic (h) or hydrophobic (H) nature.

Mention may be made, among monomers having a hydrophilic nature (h), of:

unsaturated ethylenic mono- and dicarboxylic acids, such as acrylic acid, methacrylic acid, itaconic acid, maleic acid or fumaric acid, monoalkyl esters of the above unsaturated ethylenic dicarboxylic acids, preferably with $C_1$-$C_4$ alcohols, and their N-substituted derivatives, such as, for example, 2-hydroxyethyl acrylate or methacrylate, amides of unsaturated carboxylic acids, such as acrylamide or methacrylamide, or ethylenic monomers comprising a ureido group, such as ethylene urea ethyl methacrylamide or ethylene urea ethyl methacrylate, or ethylenic monomers comprising a sulfonic acid group or one of its alkali metal or ammonium salts, such as, for example, vinylsulfonic acid, vinylbenzenesulfonic acid, α-acrylamidomethyl-propanesulfonic acid or 2-sulfoethylene methacrylate, or cationic monomers chosen from aminoalkyl (meth)acrylates or aminoalkyl(meth)acrylamides; monomers comprising at least one secondary, tertiary or quaternary amine functional group or a heterocyclic group comprising a nitrogen atom, vinylamine or ethyleneimine; diallyldialkylammonium salts; these monomers being taken alone or as mixtures, and in the form of salts, the salts preferably being chosen such that the counterion is a halide, such as, for example, a chloride, or a sulfate, a hydrosulfate, an alkyl sulfate (for example comprising 1 to 6 carbon atoms), a phosphate, a citrate, a formate or an acetate, such as dimethylaminoethyl (meth)acrylate, dimethylaminopropyl (meth)acrylate, di(tert-butyl) aminoethyl (meth)acrylate, dimethylaminomethyl (meth)acrylamide or dimethylaminopropyl(meth)acrylamide; ethyleneimine, vinylamine, 2-vinylpyridine or 4-vinylpyridine; trimethylammonium ethyl (meth)acrylate chloride, trimethylammonium ethyl acrylate methyl sulfate, benzyldimethylammonium ethyl (meth)acrylate chloride, 4-benzoylbenzyldimethylammonium ethyl acrylate chloride, trimethylammonium ethyl (meth) acrylamido chloride or (vinylbenzyl)trimethylammonium chloride; diallyldimethylammonium chloride, alone or as mixtures, or their corresponding salts, or poly(vinyl alcohol), for example resulting from hydrolysis of a poly(vinyl acetate), or cyclic amides of vinylamine, such as N-vinylpyrrolidone, or a hydrophilic monomer originating from a chemical modification of a hydrophobic block, for example by hydrolysis of a poly(alkyl acrylate) to poly(acrylic acid).

Preferably, the hydrophilic monomer units (h) are chosen from acrylic acid (AA), 2-acrylamido-2-methylpropanesulfonic acid (AMPS), styrenesulfonate (SS), N-vinylpyrrolidone, monomers comprising ureido groups, or their mixtures.

More preferably still, use is made of acrylic acid (AA) units or of ethylenic monomers comprising ureido groups.

Mention may be made, among monomers having a hydrophobic nature (H), of:

styrene-derived monomers, such as styrene, α-methylstyrene, para-methylstyrene or para-(tert-butyl)-styrene, or esters of acrylic acid or of methacrylic acid with optionally fluorinated $C_1$-$C_{12}$, preferably $C_1$-$C_8$, alcohols, such as, for example, methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate or isobutyl methacrylate, vinyl nitriles comprising from 3 to 12 carbon atoms and in particular acrylonitrile or methacrylonitrile, vinyl esters of carboxylic acids, such as vinyl acetate, vinyl versatate or vinyl propionate, vinyl halides, for example vinyl chloride, and diene monomers, for example butadiene or isoprene.

The hydrophobic monomer units (H) of the block copolymer employed in the preparation of the deposited layer of the invention are preferably esters of acrylic acid with linear or branched $C_1$-$C_8$ and in particular $C_1$-$C_4$ alcohols, such as, for example, methyl acrylate, ethyl acrylate, propyl acrylate, butyl acrylate or 2-ethylhexyl acrylate, or else styrene derivatives, such as styrene.

The other blocks of the block copolymer employed in the preparation of the deposited layer of the invention can be homopolymers of a monomer chosen from the list of (h) or (H) monomers.

The other blocks of the block copolymer employed in the preparation of the deposited layer of the invention can also be random polymers of at least two monomers chosen from the list of (h) or (H) monomers.

The block copolymers of the invention can also be triblock copolymers.

Mention may in particular be made, as block copolymers which are particularly advantageous in the context of the invention, of diblock copolymers in which the first block is a random copolymer based on acrylic acid and on vinylphosphoric acid, comprising at least 5%, preferably 10% and more preferably still 20% by weight of vinylphosphoric acid with respect to the total weight of the block, and the second block is a poly(butyl acrylate) block and in particular of the poly (acrylic acid-stat-vinylphosphonic acid)-poly(butyl acrylate) diblock copolymers, referred to as PBuA-P(AA-VPA).

These PBuA-P(AA-VPA) copolymers are characterized by an (acrylic acid)/(butyl acrylate) ratio by mass which can be between 10:90 and 90:10 and this ratio is preferably between 10:90 and 50:50.

Other block copolymers which are particularly advantageous in the context of the invention are, for example, block copolymers comprising a block of random copolymer based on acrylic acid and on vinylphosphonic acid, comprising at least 5%, preferably 10% and more preferably still 20% by weight of vinylphosphonic acid with respect to the total weight of the block, and a second block of acrylamide. These copolymers are characterized by an (acrylic acid-stat-vinylphosphonic acid block)/(acrylamide block) ratio by mass which can be between 10:90 and 90:10 and this ratio is preferably between 10:90 and 50:50.

The amphiphilic block copolymers used in the invention generally exhibit a number-average molecular mass of between 1 000 and 100 000. Generally, their number-average molecular mass is between 2 000 and 60 000.

Whatever its precise chemical composition, the block copolymer employed in producing the deposited layer of the invention can advantageously be prepared according to a controlled radical polymerization process carried out in the presence of a control agent.

The term "controlled radical polymerization" is to be understood as a specific radical polymerization process, also denoted by the term of "living polymerization", in which use is made of control agents such that the polymer chains being formed are functionalized by end groups capable of being able to be reactivated in the form of free radicals by virtue of reversible transfer and/or termination reactions.

Mention may in particular be made, as examples of such polymerization processes, of:
the processes of applications WO 98/58974, WO 00/75207 and WO 01/42312, which employ a radical polymerization controlled by control agents of xanthate type,
the process for radical polymerization controlled by control agents of dithioester type of application WO 97/01478,
the process of application WO 99/03894, which employs a polymerization in the presence of nitroxide precursors,
the process for radical polymerization controlled by control agents of dithiocarbamate type of application WO 99/31144,
the process for radical polymerization controlled by control agents of dithiophosphoro ester type of application PCT/FR01/02374,
the process of application WO 96/30421, which uses atom transfer radical polymerization (ATRP),
the process for radical polymerization controlled by control agents of iniferter type according to the teaching of Otu et al., Makromol. Chem. Rapid. Commun., 3, 127 (1982),
the process for radical polymerization controlled by degenerative transfer of iodine according to the teaching of Tatemoto et al., Jap. 50, 127, 991 (1975), Daikin Kogyo Co Ltd Japan, and Matyjaszewski et al., Macromolecules, 28, 2093 (1995),
the process for radical polymerization controlled by tetraphenylethane derivatives disclosed by D. Braun et al. in Macromol. Symp., 111, 63 (1996), or
the process for radical polymerization controlled by organocobalt complexes described by Wayland et al. in J. Am. Chem. Soc., 116, 7973 (1994).

Generally, it is preferable for the block copolymers employed according to the invention to result from a controlled radical polymerization process employing, as control agent, one or more compounds chosen from dithioesters, thioethers-thiones, dithiocarbamates and xanthates. In a particularly advantageous way, the block copolymers used according to the invention result from a controlled radical polymerization carried out in the presence of control agents of xanthate type.

According to a preferred embodiment, the block copolymer used can be obtained according to one of the processes of applications WO 98/58974, WO 00/75207 or WO 01/42312, which employ a radical polymerization controlled by control agents of xanthate type, it being possible for said polymerization to be carried out in particular under bulk conditions, in a solvent or, preferably, in an aqueous emulsion, so as to directly obtain the copolymer in the form of an aqueous or aqueous/alcoholic solution, or easily applicable at a content of between 0.01 and 50% by mass. A solution of the copolymer at a content of between 0.01 and 50% by weight obtained directly by a polymerization process in the same organic solvent can also be used.

Thus, it is possible to employ a process comprising the following stages:

a controlled radical polymerization is carried out, resulting in the production of a functionalized polymer of use as control agent in a controlled radical polymerization reaction, said stage being carried out by bringing into contact:
ethylenically unsaturated monomer molecules,
a source of free radicals, and
at least one control agent of formula (I):

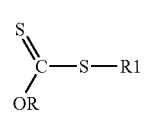

(I)

in which:
R represents:

H or Cl;
an alkyl, aryl, alkenyl or alkynyl group;
a saturated or unsaturated, optionally aromatic, carbonaceous cycle;
a saturated or unsaturated, optionally aromatic, heterocycle;
an alkylthio group,
an alkoxycarbonyl, aryloxycarbonyl, carboxyl, acyloxy or carbamoyl group;
a cyano, dialkyl- or diarylphosphonato, or dialkyl- or diarylphosphinato group;
a polymer chain,
an (R2)O— or (R2)(R'2)N— group, in which the R2 and R'2 radicals, which are identical or different, each represent:
an alkyl, acyl, aryl, alkenyl or alkynyl group;
a saturated or unsaturated, optionally aromatic, carbonaceous cycle; or
a saturated or unsaturated, optionally aromatic, heterocycle;

and

R1 represents:
an alkyl, acyl, aryl, alkenyl or alkynyl group,
a saturated or unsaturated, optionally aromatic, carbonaceous cycle;
a saturated or unsaturated, optionally aromatic, heterocycle; or
a polymer chain, (b) following stage (a), a controlled radical polymerization stage or several successive controlled radical polymerization stages is/are carried out, said stage(s) each consisting in carrying out a controlled radical polymerization resulting in the production of a functionalized block copolymer of use as control agent in a controlled radical polymerization reaction, said stage or stages being carried out by bringing into contact:
ethylenically unsaturated monomer molecules other than those employed in the preceding stage,
a source of free radicals, and
the functionalized polymer resulting from the preceding stage.

It is understood that one of the polymerization stages (a) and (b) defined above results in the formation of the anchoring block, that is to say, of the block comprising the phosphate and/or phosphonate functional groups, and that another of the polymerization stages of stages (a) and (b) results in the formation of another block. It should in particular be noted that the ethylenically unsaturated monomers employed in the stages (a) and (b) are chosen from suitable monomers in order to obtain a block copolymer as defined above.

The polymerization stages (a) and (b) are generally carried out in a solvent medium composed of water and/or of an organic solvent, such as tetrahydrofuran or a linear, cyclic or branched $C_1$-$C_8$ aliphatic alcohol, such as methanol, ethanol or cyclohexanol, or a diol, such as ethylene glycol.

An alcoholic solvent is more particularly recommended in the context of the use of hydrophilic monomers of the type of acrylic acid (AA), of acrylamide (AM), of 2-acrylamido-2-methylpropanesulfonic acid (AMPS) and of styrenesulfonate (SS) and/or in the context of the use of hydrophobic monomers, such as n-butyl acrylate, isobutyl acrylate, 2-ethylhexyl acrylate or t-butyl acrylate.

The coatings obtained by the application of the aqueous film-forming composition of the invention to a metal surface are generally such that they exhibit a strong cohesion between the surface and the coating produced.

Generally, the affinity of the coating for the metal surface is such that the 90° peel strength of this deposited layer at a peel rate of 20 mm/min, measurable, for example, using a dynamometer of Adamel-Lhomargy DY-30 type, is generally greater than or equal to 0.5 N/mm, advantageously greater than 1 N/mm, indeed even than 2 N/mm. In some cases, the peel strength can even be greater than 3 N/mm.

This strong affinity of the coating for the support is naturally reflected by very good stability of the coating on the surface.

In addition, the adhesion of the coating to the surface is not threatened in the presence of water.

Thus, even when the material is kept under 100% relative humidity conditions for a time of 72 hours, the 90° peel strength of the deposited layer generally remains greater than 0.5 N/mm and it is not rare for it to remain greater than 1 N/mm, indeed even than 2 N/mm, at a peel rate of 20 mm/min.

In the case of painted surfaces, the stability of the deposited layer can also be demonstrated by a test of resistance to wet abrasion, according to the DYN 53778 standard, which consists in rubbing the coating obtained with a brush of standardized hardness and standardized weight while dripping thereon water additivated with surfactant, which maintains the wetting of the surface, and in measuring the number of brushing cycles necessary to remove the coating over the whole of its thickness, so as to disclose the support.

In the case of painted surfaces, the stability of the deposited layer can also be demonstrated by a right-angle lattice pattern test, according to the ISO 2409 standard of November 1994, "Paints and varnishes—Cross-cut test", which consists in evaluating the resistance of a coating to being separated from its metal support when incisions are made therein in the form of a right-angle lattice pattern as far as the support using a cutter and when an attempt is made to pull off a standardized pressure-sensitive transparent adhesive tape adhesively bonded beforehand to the coating.

In the case of painted surfaces, the stability of the deposited layer can also be demonstrated by a cupping test, according to the ISO 1520 standard of June 1995, "Paint and varnishes— Cupping test", which consists in evaluating the resistance of a coat of paint, varnish or similar product to cracking and/or to detachment from a metal surface when it is subjected to a gradual deformation by cupping under standardized conditions.

In the case of painted surfaces, the stability of the deposited layer can also be demonstrated by a falling weight test, according to the ISO 6272 standard of June 1993, "Paints and varnishes—Falling-weight test", which consists in evaluating the resistance of a coating to cracking or to detachment from its metal support when it is subjected to a deformation brought about by a falling weight released under standardized conditions.

The subject matter and the advantages of the present invention will become even more clearly apparent in the light of the various implementational examples set out below.

EXAMPLE 1

Synthesis of a Diblock Copolymer Based on Acrylamide, on Acrylic Acid and on Vinylphosphonic Acid, Written PAm-block-P (AA-stat-VPA)

First Block 50 g of a 50% solution of acrylamide in water, 75 g of water, 4 g of acetone, 117 mg of 4,4'-azobis(4-cyanovaleric acid) (ACV) and 174 mg of O-ethyl S-(1-methoxycarbonyl) ethylenyl) xanthate (CH$_3$CHCO$_2$CH$_3$)S(C=S)OEt are introduced into a 500 ml round-bottomed glass flask. The reaction medium is brought to 70° C. for 5 hours.

A sample is subsequently withdrawn and analyzed. Analysis by HPLC chromatography reveals the absence of residual acrylamide. The number-average molar mass is measured by steric exclusion chromatography (SEC) in water calibrated by linear poly(ethylene oxide) standards: $M_n$=24 000 g/mol, $M_w/M_n$=1.89.

Second Block 1.32 g of vinylphosphonic acid and 70 mg of ACV are added to the polymer, in solution, resulting from the first stage. The mixture is brought to 70° C. and a solution of 7.14 g of acrylic acid in 34.7 g of water is added over 8 hours. During this introduction, 70 mg of ACV are introduced after 4 hours. This same addition is repeated after 8 hours. The reaction is maintained at this temperature for 5 hours after the end of the introduction of the monomer solution.

A sample is withdrawn and then analyzed. The acrylic acid has been completely converted (HPLC). The conversion of vinylphosphonic acid is 50% (determined by $^{31}$P NMR).

The block copolymer resulting from this process was purified by dialysis (cutoff threshold of the membrane: 1000 daltons). After dialyzing for 3 days, the copolymer is completely purified from its residual monomer ($^{31}$P NMR). SEC in water gives a measurement of $M_n$=33 300 g/mol, $M_w/M_n$=1.74. The controlled nature of the reaction is reinforced by an intense response of the polymer by SEC with UV detection at a wavelength of 290 nm, characteristic of the xanthate group at the chain end of the copolymer.

EXAMPLE 2

Synthesis of a Diblock Copolymer Based on Butyl Acrylate, on Acrylic Acid and on Vinylphosphonic Acid, Written PBuA-Block-P (AA-stat-VPA).

First Block 20 g of butyl acrylate, 32.6 g of acetone, 219 mg of azobisisobutyronitrile (AIBN) and 1.39 g of O-ethyl S-(1-methoxycarbonyl)ethylenyl) xanthate (CH$_3$CHCO$_2$CH$_3$)S(C=S)OEt are introduced into a 250 ml round-bottomed glass flask. The reaction medium is brought to 70° C. for 5 hours. 109 mg of AIBN are again added 2 hours after the beginning of the reaction.

A sample is subsequently withdrawn and analyzed. The number-average molar mass is measured by SEC calibrated by linear polystyrene standards: $M_n$=2800 g/mol, $M_w/M_n$=1.91.

Second Block 10.58 g of vinylphosphonic acid and 219 mg of AIBN are added to the polymer, in solution, resulting from the first stage. The mixture is brought to 70° C. and a solution of 57.14 g of acrylic acid in 100.9 g of water is added over 8 hours. During this introduction, a solution of 328 mg of AIBN in 2 g of acetone is added after 4 hours. This same addition is repeated after 8 hours. The reaction is maintained at this temperature for 5 hours after the end of the introduction of the monomer solution.

A sample is withdrawn and then analyzed. The acrylic acid has been completely converted (HPLC). The conversion of vinylphosphonic acid is 73% (determined by $^{31}$P NMR).

The block copolymer resulting from this process was purified by dialysis (cutoff threshold of the membrane: 1000 daltons). After dialyzing for 7 days, the copolymer is completely purified from its residual monomer ($^{31}$P NMR). The block copolymer, once purified, exists as a stable dispersion in water.

EXAMPLE 3

Synthesis of a Diblock Copolymer Based on Butyl Acrylate, on Acrylic Acid and on Vinylphosphonic Acid, Written PBuA-block-P (AA-stat-VPA).

First Block 20 g of butyl acrylate, 32.6 g of acetone, 219 mg of azobisisobutyronitrile (AIBN) and 1.39 g of O-ethyl S-(1-methoxycarbonyl)ethylenyl) xanthate (CH$_3$CHCO$_2$CH$_3$)S(C=S)OEt are introduced into a 250 ml round-bottomed glass flask. The reaction medium is brought to 70° C. for 5 hours. 109 mg of AIBN are again added 2 hours after the beginning of the reaction.

A sample is subsequently withdrawn and analyzed. The number-average molar mass is measured by SEC calibrated by linear polystyrene standards: $M_n$=2800 g/mol, $M_w/M_n$=1.91.

Second Block 3.18 g of vinylphosphonic acid and 219 mg of AIBN are added to the polymer, in solution, resulting from the first stage. The mixture is brought to 70° C. and a solution of 17.14 g of acrylic acid in 29.79 g of water is added over 3 hours. During this introduction, a solution of 328 mg of AIBN in 2 g of acetone is added after 3 hours. This same addition is repeated after 5 hours. The reaction is maintained at this temperature for 5 hours after the end of the introduction of the monomer solution.

A sample is withdrawn and then analyzed. The acrylic acid has been completely converted (HPLC). The conversion of vinylphosphonic acid is 52% (determined by $^{31}$P NMR).

The block copolymer resulting from this process was purified by dialysis (cutoff threshold of the membrane: 1000 daltons). After dialyzing for 7 days, the copolymer is completely purified from its residual monomer ($^{31}$P NMR). The block copolymer, once purified, exists as a stable dispersion in water.

EXAMPLE 4

Synthesis of a Diblock Copolymer Based on Butyl Acrylate, on Acrylamide and on Vinylphosphonic Acid, Written PBuA-block-P (Am-stat-VPA)

First Block 7 g of butyl acrylate, 30.4 g of THF, 76.5 mg of azobisisobutyronitrile (AIBN) and 486 mg of O-ethyl S-(1-methoxycarbonyl)ethyl) xanthate (CH$_3$CHCO$_2$CH$_3$)S(C=S)OEt are introduced into a 100 ml round-bottomed glass flask. The reaction medium is brought to 70° C. for 5 hours. 38.2 mg of AIBN are again added 2 hours after the beginning of the reaction.

A sample is subsequently withdrawn and analyzed. The number-average molar mass is measured by SEC calibrated by linear polystyrene standards: $M_n$=2900 g/mol, $M_w/M_n$=1.88.

Second Block 4.49 g of vinylphosphonic acid, 76.5 mg of AIBN and 91 g of water are added to the polymer, in solution, resulting from the first stage. The mixture is brought to 70° C. and 47.9 g of a 50% by weight aqueous acrylamide solution are added over 8 hours. During this introduction, 115 mg of AIBN are added after 4 hours. This same addition is repeated after 8 hours. The reaction is maintained at this temperature for 2 hours after the end of the introduction of the monomer solution.

A sample is withdrawn and then analyzed. The acrylamide has been completely converted (HPLC). The conversion of vinylphosphonic acid is 56% (determined by $^{31}P$ NMR).

The block copolymer resulting from this process was purified by dialysis (cutoff threshold of the membrane: 1000 daltons). After dialyzing for 7 days, the copolymer is completely purified from its residual monomer ($^{31}P$ NMR). The block copolymer, once purified, exists as a stable dispersion in water.

EXAMPLE 5

Synthesis of a Diblock Copolymer Based on Butyl Acrylate, on Acrylic Acid and on Vinylphosphonic Acid, Written PBuA-block-P (AA-stat-VPA)

First Block 70 g of butyl acrylate, 114 g of ethanol, 765 mg of azobisisobutyronitrile (AIBN) and 4.86 g of O-ethyl S-(1-methoxycarbonyl)ethyl xanthate $(CH_3CHCO_2CH_3)S(C=S)OEt$ are introduced into a 1 liter round-bottomed glass flask. The reaction medium is brought to 70° C. for 5 hours. 382 mg of AIBN are again added 2 hours after the beginning of the reaction.

A sample is subsequently withdrawn and analyzed. The number-average molar mass is measured by SEC calibrated by linear polystyrene standards: $M_n$=2750 g/mol, $M_w/M_n$=1.73.

Second Block 87.5 g of vinylphosphonic acid, 1.15 g of AIBN and 342 g of ethanol are added to the polymer, in solution, resulting from the first stage. The mixture is brought to 70° C. and a solution of 186.7 g of acrylic acid in 200 g of ethanol is added over 7 hours. During this introduction, 1.15 g of AIBN are added after 3 hours. This same addition is repeated after 6 hours. The reaction is maintained at this temperature for 2 hours after the end of the introduction of the monomer solution.

A sample is withdrawn and then analyzed. The acrylic acid has been completely converted (HPLC). The conversion of vinylphosphonic acid is 52% (determined by $^{31}P$ NMR). A $^{13}C$ NMR analysis made it possible to demonstrate that 28.5% of the acrylic acid units were esterified to ethyl acrylate units.

The block copolymer resulting from this process was purified by dialysis (cutoff threshold of the membrane: 1000 daltons). After dialyzing for 7 days, the copolymer is completely purified from its residual monomer ($^{31}P$ NMR). The block copolymer, once purified, exists as a stable dispersion in water.

EXAMPLE 6

Synthesis of a Phosphate-comprising Acrylic Polyol Diblock Copolymer

Synthesis of the 1st Block

A solution A, comprising 1433 g of butyl acetate, 680 g of butyl acrylate, 238 g of 2-hydroxyethyl acrylate, 238 g of 2-hydroxyethyl methacrylate, 374 g of styrene and 170 g of methyl methacrylate, is prepared in a round-bottomed glass flask.

10% by weight of the solution A and 23.6 g of O-ethyl S-(1-methoxycarbonyl)ethyl xanthate $(CH_3CHCO_2CH_3)S(C=S)OEt$ are introduced into a 6 l glass reactor equipped with a jacket and with an anchor stirrer. The reactor is degassed with argon for 15 minutes and then the temperature is increased up to 115° C. When this temperature is reached, 6.92 g of 1,1'-azobis(cyclohexane-1-carbonitrile) (initiator) are introduced and then the introduction of the remaining 90% of the solution A is begun and is continued at a constant rate for 6 hours. At the same time, the introduction of a solution of 20.77 g of 1,1'-azobis(cyclohexane-1-carbonitrile) in 200 g of butyl acetate is initiated and is continued for 11 hours. At the end of the introduction of the initiator solution, the temperature is maintained at 115° C. for an additional hour.

A sample is withdrawn and analyzed by steric exclusion chromatography (SEC). The number-average molar mass ($M_n$) is measured by elution of the polymer in THF with calibration by polystyrene. $M_n$=6700 g/mol.

Analysis by gas chromatography shows that the residual monomers are less than 2% by weight in comparison with the monomers initially employed in the polymerization.

Synthesis of the Diblock Copolymer

A solution B, comprising 393 g of butyl acetate, 181 g of butyl acrylate, 63.4 g of 2-hydroxyethyl acrylate, 18.1 g of 2-hydroxyethyl methacrylate, 99.7 g of styrene, 45.3 g of methyl methacrylate and 45.3 g of 2-(methacryloyloxy)ethyl phosphate $CH_2=C(CH_3)CH_2CH_2PO_3H$, is prepared in a round-bottomed glass flask.

6.92 g of 1,1'-azobis(cyclohexane-1-carbonitrile) are again added, at 115° C., to the polymer solution resulting from stage 1. The solution B is then introduced at a constant rate over 3 hours. At the same time, the introduction of a solution of 20.77 g of 1,1'-azobis(cyclohexane-1-carbonitrile) in 200 g of butyl acetate is initiated and is continued for 5 hours. At the end of the introduction of the initiator solution, the temperature is maintained at 115° C. for an additional hour.

A sample is withdrawn and analyzed by steric exclusion chromatography (SEC). The number-average molar mass ($M_n$) is measured by elution of the polymer in THF with calibration by polystyrene. $M_n$=10 500 g/mol.

Analysis by gas chromatography shows that the residual monomers are less than 2% by weight in comparison with the monomers initially employed in the polymerization.

EXAMPLE 7

Example of a Test of Protection from Corrosion of the Block Polymers of Examples 4 and 5

A conventional additive-free paint formulation (blank) is compared with an additivated composition of the invention.

1) Preparation of the Blank a) Preparation of 200 g of Rhodafac RS410 Solution:
    111.6 g of water are weighed out
    28.4 g of 20% aqueous ammonia are added and are mixed
    60 g of Rhodafac RS910, sold by Rhodia, are added
    stirring is carried out for 15 minutes b) Preparation of the Paint
    Stirring is carried out at low temperature
    37.62 g of faucet water are weighed out
    0.31 g of 20% aqueous ammonia is added 0.38 g of Dispex GA40 (41% solids content, i.e. 0.16 g dry), sold by Allied Colloid, is added 0.23 g of Rhodoline DF 681F (50% solids content, i.e. 0.12 g dry), sold by Rhodia, is added 24.35 g of RCL595 $TiO_2$, sold by Millenium, are added (stirring is reduced for this stage in order to avoid the formation of foam)

The mixture is left stirring for 20 minutes. This stage makes it possible to obtain a good dispersion of the $TiO_2$ 3.83 g of Butyl Carbitol Acetate or BCA are added 46.43 g of Rhodopas DS910 latex (50% solids content, i.e. 23.22 g dry), sold by Rhodia, are added (the stirring is increased: Dispermat adjusted to 0.8)

1.59 g of Texanol are added (it is preferable to add the Texanol after the latex in order to avoid the formation of "grains")

0.64 g of Rhodafac RS410 prepared in paragraph a) (30% solids content, i.e. 0.19 g dry) is added 4.62 g of Rhodoline RH-5320 (25% solids content, i.e. 1.16 g dry), a thickener sold by Rhodia, are added (the stirring speed is increased: Dispermat adjusted to 2).

2) Preparation of the Additivated Paints

The additivated paint is prepared in the same way as the blank, with the only difference that, at the end of the preparation described in point b), the polymer additive of example 4 or of example 5 is added in the form of a solution at a concentration of 2% on a dry/dry basis with respect to the level of Rhodopas DS910 latex in the paint.

The additivated paints are subsequently homogenized using a "vibrational" stirrer.

The additivated paints are subsequently filtered through a 50 μm cloth so as to remove all the "grains" and bubbles which might accelerate the corrosion on a plate and distort the results.

3) Preparation of the Paint Plates

The paint is deposited with a 300 μm film drawer on R-46 standardized steel plates supplied by Q-Panel.

4) Evaluation of the Phosphonates by Salt Spray

The painted steel plates are aged for 20 hours in salt spray and then a visual evaluation makes it possible to classify these paints.

FIG. 1 represents the steel plate painted with the additive-free reference paint (blank).

FIG. 2 represents the steel plate painted with the paint comprising the additive of example 4.

FIG. 3 represents the steel plate painted with the paint comprising the additive of example 5.

The paints additivated with compounds of examples 4 and 5 of the invention protect the steel plate from corrosion.

EXAMPLE 8

Application of a Phosphate-comprising Acrylic Polyol Diblock Copolymer as Additive in a Two-component Polyurethane Varnish Formulation The acrylic polyol of example 7 is added, at a level of 10% on a dry/dry basis, to a G-Cure 192BL80 resin. The formulation is adjusted to a solids content of 60%. Dibutyltin dilaurate is added at a level of 0.008% with respect to the solids content of the formulation. Tolonate HDT (isocyanate crosslinking agent, Rhodia) is added so that the NCO/OH ratio is equal to 1.05. A film is subsequently prepared so that the thickness of the dry film is approximately 1 mm. The substrate on which the film is deposited is aluminum.

The adhesive properties of this varnish on the aluminum were compared with those obtained in the absence of the phosphate-comprising additive.

For the two formulations, effective crosslinking was demonstrated after 24 h and 7 days by IR spectroscopy, by measurements of Persoz hardness and by measurements of resistance to the solvent methyl ethyl ketone.

An evaluation of the adhesion was undertaken by right-angle lattice pattern tests on a scale of grading from 0 to 5. Grade 0 corresponds to very poor adhesion and 5 corresponds to excellent adhesion.

The results obtained are as follows.

In the absence of phosphate-comprising diblock polymer additive. Grade=1.

In the presence of 10% of phosphate-comprising diblock polymer additive. Grade=5.

The phosphate-comprising diblock polymer additive thus provides a significant increase in the adhesion of the polyurethane varnish to the aluminum.

What is claimed is:

1. A process for providing or promoting the adhesion of a film-forming composition to a metal surface comprising the step of adding a block copolymer as an additive to said composition, wherein at least one block of the block copolymer comprises phosphate functional groups and/or phosphonate functional groups, and wherein the block copolymer is optionally dissolved in a solvent.

2. A process for protecting a metal surface from corrosion comprising the step of adding a block copolymer as additive to a film-forming composition to be applied to said surface, wherein at least one block of the block copolymer comprises phosphate functional groups and/or phosphonate functional groups, and wherein the block copolymer is optionally dissolved in a solvent.

3. The process as claimed in claim 1, wherein the metal surface is an alkali metal, alkaline earth metal, a transition metal, aluminum, gallium, indium, thallium, silicon, germanium, tin, lead, arsenic, antimony, bismuth, tellurium, polonium, astatine, their oxides or their alloys.

4. The process as claimed in claim 3, wherein the metal surface is aluminum, duralumin, zinc, tin, copper, copper alloy, bronze, brass, iron, steel, optionally stainless or galvanized, silver or vermeil.

5. The process as claimed in claim 1, wherein the block comprising phosphate and/or phosphonate functional groups is a homopolymer based on a monomer comprising phosphate or phosphonate functional groups.

6. The process as claimed in claim 1, wherein the block comprising phosphate and/or phosphonate functional groups is a random polymer based on at least one monomer comprising one or other of said phosphate or phosphonate functional groups or their mixtures in an amount of between 0.1 and 100% by weight of said monomers with respect to the total weight of the block.

7. The process as claimed in claim 6, wherein the amount of said monomers is between 0.5% and 50% by weight of said monomers with respect to the total weight of the block.

8. The process as claimed in claim 6, wherein the amount of said monomers is between 2% and 20% by weight of said monomers with respect to the total weight of the block.

9. The process as claimed in claim 5, wherein the monomer comprising phosphate or phosphonate functional groups is:

N-methacrylamidomethylphosphonic acid ester derivative,

N-methacrylamidoethylphosphonic acid ester derivative,

N-acrylamidomethylphosphonic acid ester derivative, vinylbenzylphosphonate dialkyl ester derivative, diethyl 2-(4-vinylphenyl)ethanephosphonate,
dialkylphosphonoalkyl acrylate and methacrylate derivatives,
vinylphosphonic acid, optionally substituted by cyano, phenyl, ester or acetate groups, vinylidene-phosphonic acid, in the sodium salt form or the form of its isopropyl ester, or bis(2-chloroethyl)vinylphosphonate,
acrylate of polyethylene glycol omega phosphates,
methacrylate of polyethylene glycol omega phosphates,
acrylates of polypropylene glycol omega phosphates, or
methacrylate of polypropylene glycol omega phosphates.

10. The process as claimed in claim 9, wherein the monomer comprising phosphate or phosphonate functional groups is:
N-methacrylamidomethylphosphonic n-propyl ester,
N-methacrylamidomethylphosphonic methyl ester,
N-methacrylamidomethylphosphonic ethyl ester,
N-methacrylamidomethylphosphonic n-butyl ester,
N-methacrylamidomethylphosphonic isopropyl ester,
N-methacrylamidomethylphosphonic diacid,
N-methacrylamidoethylphosphonic acid dimethyl ester,
N-methacrylamidoethylphosphonic acid di(2-butyl-3,3-dimethyl) ester,
N-methacrylamidoethylphosphonic diacid,
N-acrylamidomethylphosphonic acid dimethyl ester,
N-acrylamidomethylphosphonic acid diethyl ester,
bis(2-chloropropyl) N-acrylamidomethylphosphonate,
N-acrylamidomethylphosphonic acid,
vinylbenzylphosphonate dialkyl di(n-propyl),
vinylbenzylphosphonate dialkyl ester di(isopropyl),
vinylbenzylphosphonate dialkyl ester diethyl,
vinylbenzylphosphonate dialkyl ester dimethyl,
vinylbenzylphosphonate dialkyl ester di(2-butyl-3,3-dimethyl),
vinylbenzylphosphonate dialkyl ester di(t-butyl),
vinylbenzylphosphonic diacid,
2-(acryloyloxy)ethylphosphonic acid dimethyl ester,
2-(methacryloyloxy)ethylphosphonic acid dimethyl ester,
2-(methacryloyloxy)methylphosphonic acid diethyl ester,
2-(methacryloyloxy)methylphosphonic acid dimethyl ester,
2-(methacryloyloxy)propylphosphonic acid dimethyl ester,
2-(acryloyloxy)methylphosphonic acid diisopropyl ester,
2-(acryloyloxy)ethylphosphonic acid diethyl ester,
2-(methacryloyloxy)ethylphosphonic acid,
2-(methacryloyloxy)methylphosphonic acid,
2-(methacryloyloxy)propylphosphonic acid,
2-(acryloyloxy)propylphosphonic acid, or
2-(acryloyloxy)ethylphosphonic acid.

11. The process as claimed in claim 1, wherein the block copolymer is obtained as the result of a controlled radical polymerization process optionally using, as control agent, a dithioester, thioethers-thione, dithiocarbamate or xanthate, said polymerization being carried out under bulk conditions, in a solvent or in an aqueous emulsion, so as to directly obtain the copolymer in the form of an aqueous or aqueous/alcoholic solution.

12. The process as claimed in claim 11, wherein the concentration of block copolymer in the film-forming composition is between 0.001 and 20% by mass with respect to the total mass of the solids content of the film-forming composition.

13. The process as claimed in claim 12, wherein the concentration of block copolymer in the film-forming composition is between 0.005 and 10% by mass with respect to the total mass of the solids content of the film-forming composition.

14. The process as claimed in claim 13, wherein the block copolymer in the film-forming composition has a concentration of between 0.01 and 5% by mass with respect to the total mass of the solids content of the film-forming composition.

15. An aqueous film-forming composition, comprising a block copolymer, wherein at least one block comprises phosphate functional groups and/or phosphonate functional groups, wherein the block comprising phosphate and/or phosphonate functional groups is a homopolymer based on a monomer comprising phosphate or phosphonate functional groups and said block copolymer optionally being dissolved in a solvent.

16. The composition as claimed in claim 15, wherein the block comprising phosphate and/or phosphonate functional groups is a random polymer based on at least one monomer comprising one or other of said phosphate or phosphonate functional groups or their mixtures in an amount of between 0.1 and 100% by weight of said monomers with respect to the total weight of the block.

17. The composition as claimed in claim 16, wherein the amount of said monomers is between 0.5% and 50% by weight of said monomers with respect to the total weight of the block.

18. The composition as claimed in claim 17, wherein the amount of said monomers is between 2% and 20% by weight of said monomers with respect to the total weight of the block.

19. The process as claimed in claim 15, wherein the monomer comprising phosphate or phosphonate functional groups is:
N-methacrylamidomethylphos-phonic acid ester derivative,
N-methacrylamidoethylphosphonic acid ester derivative,
N-acrylamidomethylphosphonic acid ester derivative,
vinylbenzylphosphonate dialkyl ester derivative,
diethyl 2-(4-vinylphenyl)ethanephosphonate,
dialkylphosphonoalkyl acrylate and methacrylate derivatives,
vinylphosphonic acid, optionally substituted by cyano, phenyl, ester or acetate groups, vinylidene-phosphonic acid, in the sodium salt form or the form of its isopropyl ester, or bis(2-chloroethyl)vinylphosphonate,
acrylate of polyethylene glycol omega phosphates,
methacrylate of polyethylene glycol omega phosphates,
acrylates of polypropylene glycol omega phosphates, or
methacrylate of polypropylene glycol omega phosphates.

20. The composition as claimed in claim 19, wherein the monomer comprising phosphate or phosphonate functional groups is:
N-methacrylamidomethylphosphonic n-propyl ester,
N-methacrylamidomethylphosphonic methyl ester,
N-methacrylamidomethylphosphonic ethyl ester,
N-methacrylamidomethylphosphonic n-butyl ester,
N-methacrylamidomethylphosphonic isopropyl ester,
N-methacrylamidomethylphosphonic diacid,
N-methacrylamidoethylphosphonic acid dimethyl ester,
N-methacrylamidoethylphosphonic acid di(2-butyl-3,3-dimethyl) ester,
N-methacrylamidoethylphosphonic diacid,
N-acrylamidomethylphosphonic acid dimethyl ester,
N-acrylamidomethylphosphonic acid diethyl ester,
bis(2-chloropropyl) N-acrylamidomethylphosphonate,
N-acrylamidomethylphosphonic acid,
vinylbenzylphosphonate dialkyl di(n-propyl),
vinylbenzylphosphonate dialkyl ester di(isopropyl), vinylbenzylphosphonate dialkyl ester diethyl,
vinylbenzylphosphonate dialkyl ester dimethyl,
vinylbenzylphosphonate dialkyl ester di(2-butyl-3,3-dimethyl),
vinylbenzylphosphonate dialkyl ester di(t-butyl),
vinylbenzylphosphonic diacid,
2-(acryloyloxy)ethylphosphonic acid dimethyl ester,
2-(methacryloyloxy)ethylphosphonic acid dimethyl ester,
2-(methacryloyloxy)methylphosphonic acid diethyl ester,
2-(methacryloyloxy)methylphosphonic acid dimethyl ester,
2-(methacryloyloxy)propylphosphonic acid dimethyl ester,
2-(acryloyloxy)methylphosphonic acid diisopropyl ester,
2-(acryloyloxy)ethylphosphonic acid diethyl ester,
2-(methacryloyloxy)ethylphosphonic acid,
2-(methacryloyloxy)methylphosphonic acid,
2-(methacryloyloxy)propylphosphonic acid,
2-(acryloyloxy)propylphosphonic acid, or
2-(acryloyloxy)ethylphosphonic acid.

21. The composition as claimed in claim 15, wherein the block copolymer is obtained as the result of a controlled radical polymerization process optionally using, as control agent, a dithioester, thioethers-thione, dithiocarbamate or xanthate, said polymerization being carried out under bulk conditions, in a solvent or in an aqueous emulsion, so as to directly obtain the copolymer in the form of an aqueous or aqueous/alcoholic solution.

22. The composition as claimed in claim 15, wherein the concentration of block copolymer in the film-forming composition is between 0.001 and 20% by mass with respect to the total mass of the solids content of the film-forming composition.

23. The composition as claimed in claim 22, wherein the concentration of block copolymer in the film-forming composition is between 0.005 and 10% by mass with respect to the total mass of the solids content of the film-forming composition.

24. The composition as claimed in claim 23, wherein the block copolymer in the film-forming composition has a concentration of between 0.01 and 5% by mass with respect to the total mass of the solids content of the film-forming composition.

25. The composition as claimed in claim 15, wherein the composition is an optionally silicone-comprising mastic composition, paint composition or adhesive composition.

26. The composition of claim 1, wherein the solvent is water or a water/alcohol mixture.

27. The composition of claim 2, wherein the solvent is water or a water/alcohol mixture.

28. The composition of claim 15, wherein the solvent is water or a water/alcohol mixture.

* * * * *